United States Patent Office 3,322,717
Patented May 30, 1967

3,322,717
POLYURETHANES STABILIZED WITH
XANTHOGEN DISULFIDES
Charles Edwin Kendall, Downer, Canberra, Australian Capital Territory, Australia, and Douglas Wynne Huke, Grimsby, England, assignors to Dunlop Rubber Company Limited, London, England, a British company
No Drawing. Filed June 30, 1964, Ser. No. 379,399
Claims priority, application Great Britain, July 2, 1963, 26,121/63
9 Claims. (Cl. 260—45.7)

This invention relates to polymeric compositions, and more particularly to polyurethane compositions, and is an improvement in or modification of the invention described and claimed in our co-pending application Ser. No. 119,297, now Patent No. 3,151,098.

In said co-pending application Ser. No. 119,297, now Patent No. 3,151,098, we have described and claimed a polyurethane composition containing, as an antioxidant, a dithiocarbamate compound having the general formula $R_1(R_2)NCSS$—$A$—$SSCN(R_3)R_4$, where $R_1$, $R_2$, $R_3$ and $R_4$ are alkyl or aryl groups, or hydrogen respectively, and A is an alkylene or arylene group.

According to the present invention a polyurethane composition contains, as an antioxidant, a compound having the general formula RXCS—SS—SCXR$_1$, wherein R and $R_1$ each represent an alkyl group, an alicyclic group, an aralkyl group or an aryl group, and X represents an oxygen atom or a sulphur atom.

The polyurethane compositions of the present invention are resistant to ageing by heat and light, and show only a very slight discolouration when compared with polyurethane compositions containing other antioxidants such as metal dithiocarbamates which show considerable discolouration. The rate at which the polyurethane composition absorbs oxygen from the atmosphere is reduced when the antioxidant is incorporated as compared with compositions not containing the antioxidant.

The antioxidant incorporated in the polyurethane composition can be a xanthogen disulphide compound. The R and $R_1$ groups preferably contain not more than 8 carbon atoms, and the preferred compounds are diisopropyl xanthogen disulphide, dimethyl xanthogen disulphide, diisobutyl xanthogen disulphide and diamyl xanthogen disulphide.

The polyurethane can be formed by any of the well-known techniques and usually is formed from a polyol of compounds such as a polyether, polyester or polyesteramide and a polyisocyanate. Aliphatic or aromatic polyisocyanates or polyisothiocyanates can be used. The polyol can be reacted with an amount of the polyisocyanate or polyisothiocyanate sufficient to produce a prepolymer which can then be formed into a cross-linked product by the addition of a cross-linking agent, or which can be chain-extended by use of a chain-extension agent. Alternatively, a one-shot process can be employed in which the polyol, polyisocyanate or polyisothiocyanate, and a cross-linking agent or chain-extension agent are reacted together in the presence of a catalyst, if desired.

The antioxidants of the present invention are particularly useful for protection against oxidation of polyurethanes based on polyether polyols and aliphatic diisocyanates obtained employing a catalyst based on a tin salt such as a dialkyl tin diester, e.g., dibutyl tin dilaurate, or a tin soap. The polyurethanes obtained give clear films and it is necessary that any antioxidant incorporated should not substantially stain the polyurethane, especially when the polyurethane composition is in contact with copper compounds. The metal dithiocarbamates available for use as antioxidants have caused excessive staining on contact with copper compounds. The antioxidants of the present invention confer a reasonable resistance to oxygen on the polyurethane whilst being substantially non-staining.

The antioxidant can be added at any convenient stage during the manufacture of the polyurethane composition, for instance it can be added to a prepolymer previously formed, or it can be added during the formation of the prepolymer. The polyurethane composition can be a non-cellular composition or a foam composition produced by any of the well-known techniques to effect foaming.

The amount of antioxidant that is incorporated can vary within a wide range, for example of from 0.01 percent to 5 percent of the weight of the polyurethane or the polyurethane-forming ingredients. Preferably, the amount of the antioxidant is from 0.5 percent to 2 percent of the weight of the polyurethane.

The invention is illustrated by the following example in which all parts are by weight:

Example 200 parts of Teracol 30, a polytetramethylene ether glycol of molecular weight approximately 3000, were dehydrated by heating under vacuum, except for a very slow bleed of pure nitrogen, for 2 hours at 110° C. to 120° C. with stirring. The temperature was lowered to 100° C. and this temperature was maintained during the addition of 11.2 parts of hexamethylene diisocyanate over a period of 1 hour. The nitrogen bleed and stirring were continued throughout. Heating and stirring was continued for a further 2 hours during the addition of a further 22.4 parts of hexamethylene diisocyanate. After continuing the heating at 100° C. and stirring for a further 2 hours, the product was allowed to cool, yielding a water-white syrup of viscosity 50,000 cps. at 25° C.

To 100 parts of the syrup were added 0.5 part of anhydrous trimethylol propane and 0.1 part of dibutyl tin dilaurate, both as 3 percent solutions in dry acetone, together with 1 part of diisopropyl xanthogen disulphide as antioxidant.

A suitable quantity of the liquid mixture was poured into a carefully levelled shallow plate glass tray to form a film approximately 0.010 inch thick. The solvents were allowed to evaporate at room temperature for 45 minutes, and the tray was then placed in an oven at 100° C. for 10 minutes, after which time the composition had jelled to an elastomeric film approximately 0.010 inch thick. Heating was continued for 50 minutes to ensure completion of the reaction. After soaking in water the film was stripped from the glass support, and allowed to dry. A clear, elastic film was obtaind.

The above procedure was repeated three times but using the xanthogen disulphides given in Table I instead of the diisopropyl xanthogen disulphide.

For purposes of comparison a similar film was produced without the inclusion of a xanthogen disulphide compound.

The films were tested by (A) determining the time (hours) to absorb 1 percent of their weight of oxygen in all-glass apparatus in an atmosphere of oxygen and (B) measuring the time (hours) for the film to show appreciable loss of strength when aged in a ventilated oven, the temperature in both cases being 100° C. The results of these two tests (A) and (B) are given below. The resistance of the films to staining when immersed for 1 hour in a 1 percent aqueous solution of cupric sulphate pentahydrate containing 2 percent of a soap was also observed.

The results are given in Table I, in which DPX represents diisopropyl xanthogen disulphide, DMX represents dimethyl xanthogen disulphide, DBX represents diisobutyl xanthogen disulphide and DAX represents diamyl xanthogen disulphide, Colour (oven) represents the degree of yellowing of the films after experiment B, and Colour (copper) represents the degree of yellowing of the films after copper staining.

TABLE 1

| Antioxidant | A | B | Colour (oven) | Colour (copper) |
|---|---|---|---|---|
| None | 1 | 4 | No staining | No staining. |
| DPX | 100 | 18 | Slight | Very slight. |
| DMX | | 24 | ---do--- | Slight. |
| DBX | | 16 | ---do--- | Do. |
| DAX | | 16 | ---do--- | Do. |

Having now described our invention what we claim is:

1. A polyurethane composition being a reaction product of a polyether polyol and a liquid diisocyanate containing as an anti-oxidant a compound having the general formula $RXCS—SS—SCXR_1$ wherein R and $R_1$ each represents a group selected from the class consisting of alkyl groups, alicyclic groups, aralkyl groups and aryl groups, and X represents a member selected from the class consisting of oxygen atoms and sulphur atoms.

2. A polyurethane composition according to claim 1 in which each of the groups R and $R_1$ contains up to 8 carbon atoms.

3. A polyurethane composition according to claim 1 in which the amount of the antioxidant is from 0.01 percent to 5 percent based on the weight of the polyurethane.

4. A polyurethane composition according to claim 3 in which the amount of the antioxidant is from 0.5 percent to 2 percent based on the weight of the polyurethane.

5. A polyurethane composition according to claim 1 in which the antioxidant is a dialkyl xanthogen disulphide.

6. A polyurethane composition according to claim 5 in which the antioxidant is diisopropyl xanthogen disulphide.

7. A polyurethane composition according to claim 5 in which the antioxidant is dimethyl xanthogen disulphide.

8. A polyurethane composition according to claim 5 in which the antioxidant is diisobutyl xanthogen disulphide.

9. A polyurethane composition according to claim 5 in which the antioxidant is diamyl xanthogen disulphide.

References Cited

UNITED STATES PATENTS 3,151,098  9/1964  Watson et al. _____ 260—45.9

FOREIGN PATENTS 503,255  5/1951  Belgium.

LEON J. BERCOVITZ, *Primary Examiner.*

DONALD E. CZAJA, *Examiner.*

M. J. WELSH, *Assistant Examiner.*